US005257045A

United States Patent [19]

Bergen et al.

[11] Patent Number: 5,257,045

[45] Date of Patent: Oct. 26, 1993

[54] IONOGRAPHIC PRINTING WITH A FOCUSED ION STREAM

[75] Inventors: Richard F. Bergen, Ontario; Joseph A. Chizuk, Jr., Webster; Robert W. Gundlach, Victor, all of N.Y.

[73] Assignee: Xerox Corporation, Stamford, Conn.

[21] Appl. No.: 887,943

[22] Filed: May 26, 1992

[51] Int. Cl.[5] ........ G01D 15/06

[52] U.S. Cl. ........ 346/159

[58] Field of Search ........ 346/159

[56] References Cited

U.S. PATENT DOCUMENTS

| | | | |
|---|---|---|---|
| 3,220,324 | 11/1965 | Snelling | |
| 3,962,969 | 6/1976 | Watanabe et al. | 346/75 |
| 4,143,381 | 3/1979 | Downie | 346/159 X |
| 4,463,363 | 7/1984 | Gundlach et al. | 346/159 |
| 4,524,371 | 6/1985 | Sheridon et al. | 346/159 |
| 4,675,703 | 6/1987 | Fotland | 346/159 |
| 4,763,141 | 8/1988 | Gundlach et al. | 346/158 |
| 4,804,980 | 2/1989 | Snelling | 346/159 |
| 4,809,026 | 2/1989 | Boyer et al. | 346/155 |
| 4,809,027 | 2/1989 | Boyer et al. | 346/159 |
| 4,839,670 | 6/1989 | Snelling | 346/153.1 |
| 5,153,435 | 10/1992 | Greene | 346/159 X |

*Primary Examiner*—George H. Miller, Jr.
*Attorney, Agent, or Firm*—R. Hutter

[57] ABSTRACT

An ionographic printer directs a stream of ions from a source to a charge receptor to create an electrostatic latent image thereon. The ion stream passes through a relatively large aperture having associated therewith a focusing pinch electrode for narrowing the ion stream to a preselected width, and displacing electrodes for positioning the narrowed ion stream within the aperture. Varying the biases of the displacing electrodes causes the ion stream to scan across the aperture to deposit multiple spots of charged areas at desired locations on the receptor.

17 Claims, 9 Drawing Sheets

IONOGRAPHIC PRINTING WITH A FOCUSED ION STREAM

The present invention relates to ionographic printers, and more particularly, to an apparatus for directing ions in imagewise fashion onto a charge receptor.

In electrophotographic printing, an electrostatic latent image is formed on a charge retentive surface. In the well-known process of xerography, the original electrostatic latent image is formed by providing a photosensitive charge-retentive surface, known as a "photoreceptor," which typically is first charged and then caused to discharge in areas corresponding to the image to be printed when an original light image to be copied is focused on the photoreceptor. The white areas of the original image cause the corresponding areas on the photoreceptor to discharge, while the printed areas (such as alphanumeric characters) on the original image create corresponding dark areas on the photoreceptor, on which the original charge is retained. This latent image is developed by causing toner particles to adhere to the charged areas on the surface. The toner forming this developed image on the surface is then transferred to a sheet, such as of paper, and then the toner is fused on the sheet to form a permanent image.

Another type of printing is known as ionography. In ionography, instead of using light to selectively discharge areas of a charged photoreceptor, a charge-retentive surface is charged in an imagewise fashion by the direct application of ions onto the charge retentive surface, known simply as a charge receptor. Thus, in ionography, the charge-receptive surface need not be photosensitive. The basic principle of ionography is described, for example, in U.S. Pat. No. 3,220,324. In this early patent, an optical image is projected onto a control screen in association with a corona discharge device. The screen responds to the optical image, and controls the deposition of electrostatic charge on a target member. The corona discharge device causes ions to pass through the screen to the charge receptor, but only those areas on the screen properly responding to the optical image will allow the ions to pass through the screen onto the receptor. In this way, a latent image corresponding to the original image is formed on the charge receptor.

Since that early patent, there has been a series of improvements to the basic ionographic process, particularly as regards the creation of a desired latent image on the receptor, based on either an exposure of an original image (as in a copier) or as electronically-stored digital data. U.S. Pat. No. 4,463,363 discloses an ionographic printer wherein ions are generated in a chamber, entrained in a rapidly moving fluid stream passing through the chamber, modulated in an electroded exit zone by being selectively emitted or inhibited therein, and finally deposited in an imagewise pattern on a movable receptor. The electrodes by the exit zone of the chamber are arranged in a linear array perpendicular to the process direction of the receptor, and selectively operated according to imagewise digital data as the receptor moves past the exit zone.

U.S. Pat. No. 4,524,371 discloses a fluid jet assisted ionographic printer. A bent path channel, disposed through the housing, directs transport fluid with ions entrained therein adjacent a linear array of modulated electrodes.

U.S. Pat. No. 4,675,703 discloses an ionographic printer in which a solid dielectric member having a control electrode and a driver electrode disposed at opposite phases thereof, to cause the formation of ions in a region adjacent the controlled electrode. A screen electrode and a deflection electrode are employed to modulate flow of the ions to a charge receptor. The screen electrode is maintained at a fixed potential to control passage of ions through one or more apertures therein, while the deflection electrode provides further control over the size, shape and location of the electrostatic images created on the charge receptor. The deflection electrode may take the form of a conductive member on one side of the ion path, or two or more conductors stradding this path.

U.S. Pat. No. 4,763,141 discloses an ion source in which a corona wire located 1-5 mm away from biased conductive plates which form a slit that allows ions to pass therethrough onto a receptor surface. The conductive plates are used to control the flow of ions through the slit and opposing wedges are positioned on each conductive plate to focus additional ions to the center of the slit. At the inside edges of the slit are additional fringe electric fields that aid in pumping the ions out of the slit.

U.S. Pat. No. 4,804,980 discloses an ionographic printer wherein a plurality of tiny apertures may be selectably addressed in imagewise fashion for a selectable passage of ions therethrough onto a photoreceptor. The apertures are addressed by means of a laser writing beam which is scanned across the apertures to write latent electrostatic images thereon, which thereafter modulate the flow of ions through the apertures in accordance with the latent electrostatic image written on the screen. The laser writing beam is on the whole similar to a raster output scanner familiar in the art of laser printing.

U.S. Pat. Nos. 4,809,026 and 4,809,027 disclose an electrostatic printhead system in which a heated airflow is ionized in a chamber, and the resulting ions are caused to pass through an array of selectably-addressable apertures for creation of an electrostatic image on a charge receptor surface. The heated air serves to reduce chemical deposit accumulation at the printhead.

U.S. Pat. No. 4,839,670 discloses a control bar for controlling the flow of ions in an imagewise fashion onto a receptor. The bar includes a plurality of parallel rows of apertures, each aperture having a ring-like controlled electrode for the selective imagewise activation of various apertures. The line-by-line image data associated with the desired image is fed through successive rows of apertures in a manner coordinated with the motion of the receptor, in order to improve the quality of the latent image.

In accordance with the present invention, an ionographic image printing apparatus comprises an ion source, a charge receptor, and an ion deposition control device operatively interposed between the ion source and the charge receptor. The control device includes means for narrowing ions emitted from the ion source into a stream of a predetermined cross-sectional area, and means for displacing the stream to a predetermined position on the charge receptor.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 9:
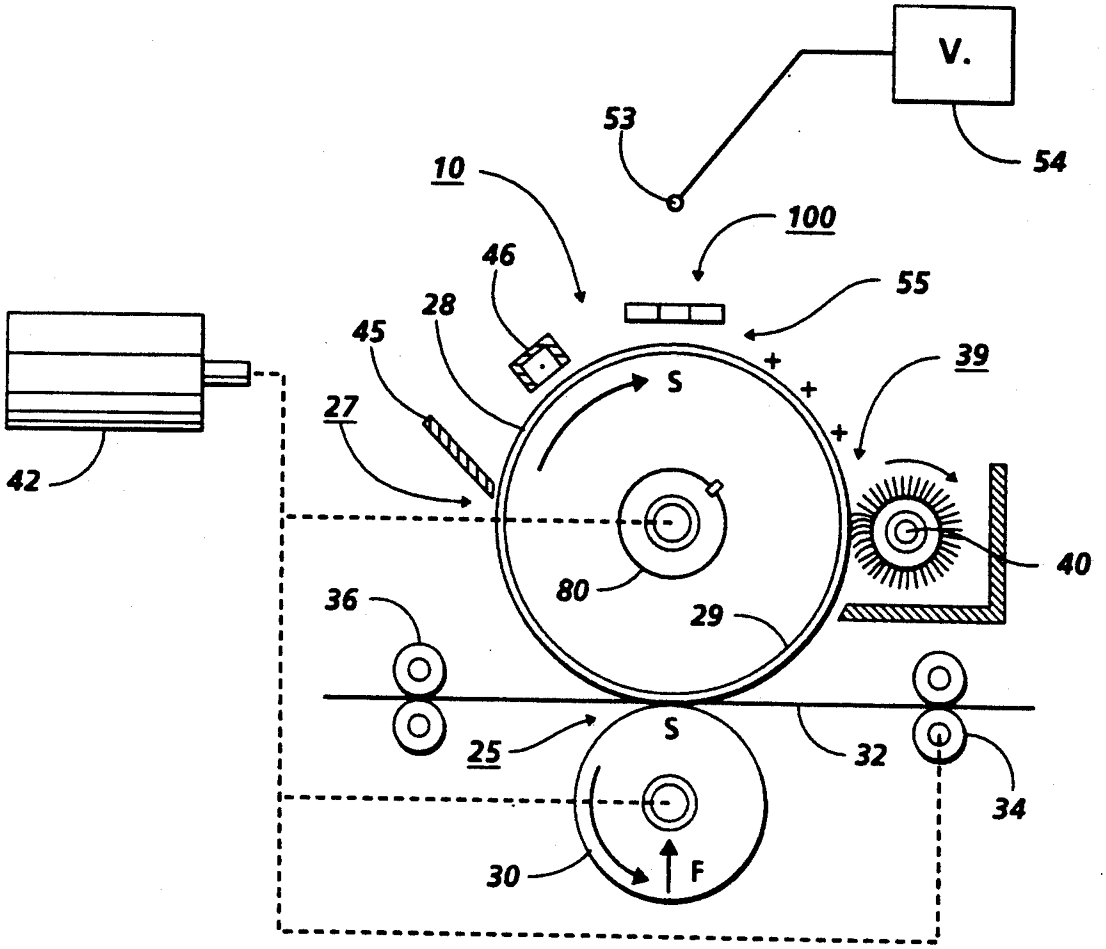
FIG. 9 PRIOR ART
FIG. 9 is a simplified elevational view of an ionographic printer incorporating the present invention.

FIG. 9 shows the basic elements of an ionographic printer. Printer 10 includes a dielectric charge receptor 27 in the form of a conductive substrate 29, here in the form of a drum or cylinder, having an electrostatically chargeable dielectric layer on its surface 28. While the receptor of printer 10 is shown and described in the form of a drum, other receptor types, such as a belt, may be envisioned. Receptor 27 is suitably supported for rotation in the direction shown by the solid line arrow in a suitable housing (not shown). In the example embodiment shown, a pressure cylinder or roller 30 is rotatably supported below receptor 27 and in operative relation thereto, at transfer station 25, roller 30 cooperating with receptor 27 to define a nip through which copy sheets 32 may pass. Roll pair 34 on the upstream side of transfer station 25 and roll pair 36 on the downstream side of transfer station 25 are provided for bringing sheets 32 into and out of transfer relation with receptor 27 at transfer station 25. Other methods for transfer of developed images, as opposed to pressure roller 30 shown, include electrostatic transfer using one or more transfer coronodes. Other transfer methods familiar in the general art of xerography will be apparent to one skilled in the art.

Sheets 32 are supplied from a suitable source such as a paper tray (not shown) having sheet feeder means and activated to advance the sheets forward in timed register relation with the images on receptor 27 for feeding to transfer station 25.

A developer roll 40 is provided at developing station 39 for developing the latent electrostatic images formed on receptor 27 prior to transfer. Developer roll 40 is rotatably mounted within a developer housing having a supply of toner for use of developing the electrostatic images on surface 28 of receptor 27. Developer roll 40 typically rotates in a direction opposite that of receptor 27, as shown by the arrow. Receptor 27, pressure roller 30, roll pairs 34 and 36, and developer roll 40 are suitably drivingly coupled to and rotated by a suitable motor 42.

To remove residual or leftover toner powder from receptor 27 after the transfer step, a scraper blade 45 is provided. Blade 45 engages against the surface of receptor 27 to wipe toner therefrom. A suitable erase apparatus 46 is provided downstream of blade 45, to discharge any left over charges remaining of receptor 27.

The latent electrostatic images formed in the dielectric layer forming surface 28 of receptor 27 that are thereafter developed by developer roll 40 form a toner powder image on the charge receptor. The toner powder image is then simultaneously transferred and fixed to the sheet 32 at transfer station 25 through pressure engagement between receptor 27 and roller 30. Once again, alternate transfer techniques are well-known and applicable to the present invention.

At the beginning of the ionographic process, at a step corresponding to the top of receptor 27 as shown in FIG. 9, the originally-discharged surface 28 of receptor 27 is charged in imagewise fashion by ions emitted from source 53, which is typically, though not necessarily, in the form of a corona wire, or, more preferably, a series of electrically biased pin points arranged in a line or a staggered line generally adjacent the receptor 27 across the width thereof. The source 53 is typically connected to a voltage source 54. Interposed between the source 53 and the surface 28 of receptor 27 is a control device generally indicated as 100. Control device 100 has defined therein a plurality of openings to selectably allow the passage of ions from source 53 to the surface 28 of receptor 27, as receptor 27 moves in a process direction. The imagewise deposition of ions on the moving receptor 27 is caused by selective control of the apertures in control device 100 either to permit or not permit the passage of ions therethrough in accordance with digital image data. By coordination of the imagewise modulation of the ion flow through the openings in control device 100 with the motion of receptor 27, the ions emitted from source 53 form the desired electrostatic latent image on receptor 27 for subsequent development at developing station 39 and transfer to a sheet at transfer station 25.

Figure 1:
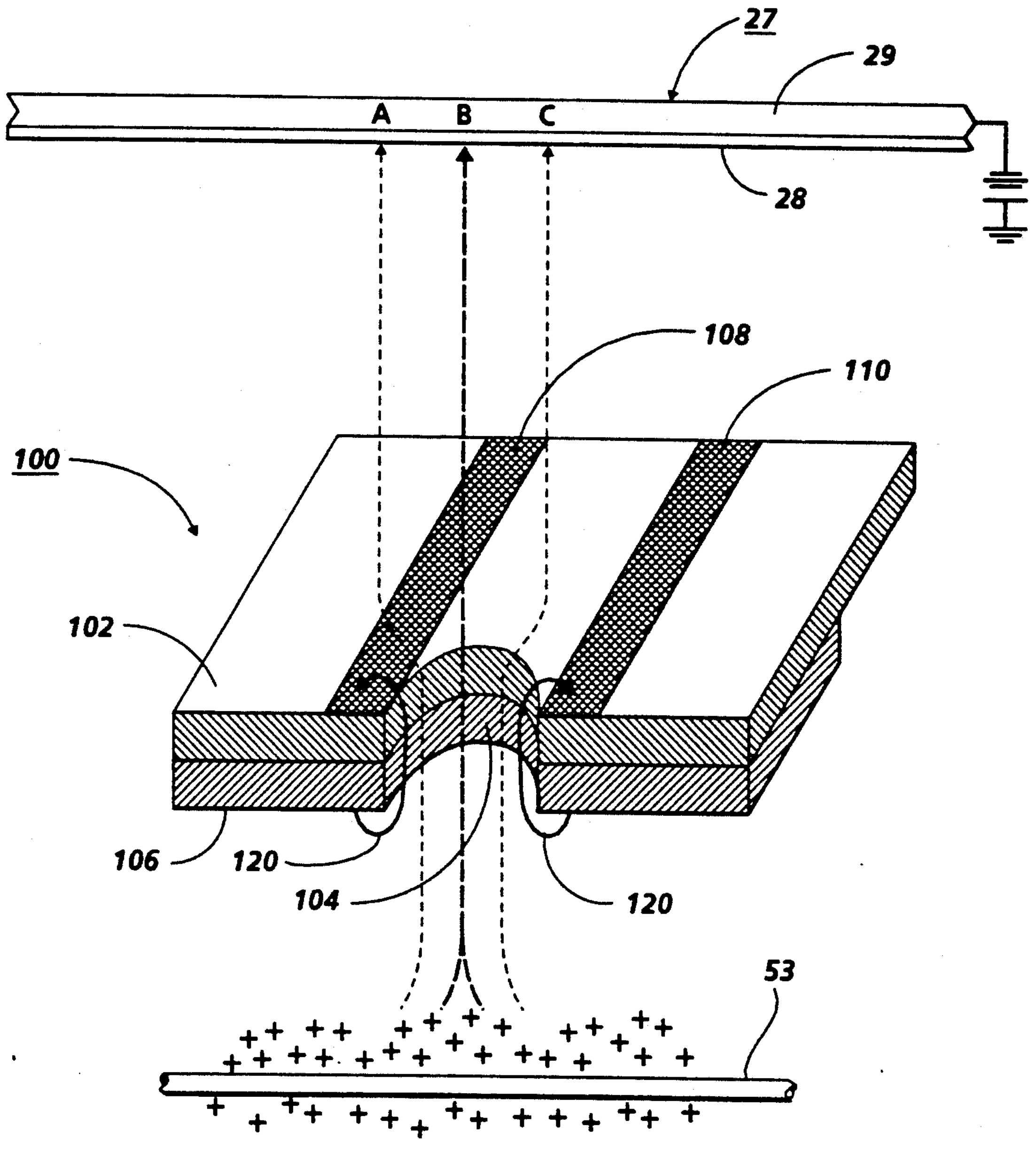
FIG. 1 is a detailed sectional elevational view of an ion stream control device according to the present invention.

FIG. 1 is a sectional elevational view through one opening in control device 100, showing the passage of positive ions, indicated as + symbols, from the source 53 through the opening to the surface 28 of receptor 27. (Although a source of positive ions is shown in the present embodiment, it will be understood that the invention could be made to work with a source of negative ions as well.) Source 53 may be in the form of a corona wire extending adjacent a plurality of such openings 104 arranged in a linear or staggered linear array, or possibly the source 53 may be in the form of electrically biased pin points centered adjacent each individual opening 104. Device 100 comprises an insulative substrate 102 having an opening 104 defined therein for the passage of ions therethrough. On the side of the substrate 102 facing the source 53 and, in this embodiment, substantially surrounding the entire edge of opening 104 is what shall be referred to herein as "pinch" electrode 106. On the side of substrate 102 facing receptor 27 are a first displacing electrode, indicated as 108, and a second displacing electrode, indicated as 110. As shown in FIG. 1, the displacing electrodes 108 and 110 are placed on the side of the substrate 102 facing receptor 27 and configured such that the displacing electrodes 108 and 110 are disposed on opposite sides along the edge of opening 104, and therefore electrically separated.

In general, substrate 102 may be made of any suitable dielectric substance such as plastic, although polycarbonates and synthetic materials such as that sold under the trade name "Kapton" are particularly suitable. A preferred thickness of substrate 102 is from 0.002 inches to 0.125 inches. Typical suitable materials for the pinch electrode 106 and the displacing electrodes 108 and 110 include copper, although conductors which are less apt to corrode in an ionized environment, such as gold or stainless steel, are preferred. A preferred range of diameter for opening 104 is from about 0.005 inches to 0.2 inches.

In operation, ions are caused to pass from the source 53 through control device 100 to receptor 27 in the following manner. Leaving aside for the time being considerations of placements of ions on a specific area of the receptor 27, the ions from source 53 are caused to move in the desired manner due to the potential difference between the source 53 and pinch electrode 106. This creates a "potential well" to drive the ions in the control device 100. The pinch electrode 106, the displacing electrodes 108 and 110, and the receptor 27 are respectively biased from high to low potentials, or specifically from more positive to less positive voltages, in that order. For example, typical values of DC bias for the respective elements would be as follows: the corona wire in source 53, +5000 volts; the pinch electrode 106, +1300 volts; displacing electrodes 108 and 110, +1000 volts each; and surface 28 of receptor 27, 0 volts. In general, the relative values of these biases are more important than their absolute values; the zero point in this descending order of DC biases is not important as long as the descending order is maintained. It is possible that surface 28 of receptor 27, for example, may have a very small positive bias, zero bias, or a negative bias, as long as a potential well effect is maintained. As the ions emitted from source 53 are of a positive charge, a negative bias on the surface 28 of receptor 27 will advance the passage of ions thereto.

When the pinch electrode 106 and the displacing electrodes 108 and 110 are biased to form a potential well, these electrodes create "pumping" electric fields on either side of opening 104, the fields being generally in the direction of an ion stream passing from source 53 through opening 104 to receptor 27. In the case where there is no lateral displacement of the ion stream through opening 104, the ions from source 53 will pass straight through opening 104 and "land" on surface 28 at the point marked B. One specific function of the pinch electrode 106 is to control the width of the ion stream passing through the opening 104. These pumping fields, such as that shown by arrows 120, have the effect of "catching" the ion stream from source 53 (the ions being naturally attracted to progressively lower potentials) and, in effect, focusing or acting as a funnel to draw the ion stream through opening 104. As pinch electrode 106 is, in the usual case, biased more positively relative to either of the displacing electrodes 108 or 110 on the other side of substrate 102, the pumping fields are caused to loop through the opening 104 from pinch electrode 106 to either of the displacing electrodes 108 or 110. The strength of these fields 120 serve to control the width of the ion stream through opening 104; that is, the greater the voltage difference between pinch electrode 106 and displacing electrodes 108 and 110, the stronger electric fields 120, and the narrower the ion stream through opening 104 and the smaller the resulting spot on the receptor 27. The bias on pinch electrode 106 therefore serves to collect and "pinch," or narrow, the width of the ion stream. The width of the resulting stream can be made significantly smaller (e.g., one-third to one-tenth the diameter, or even smaller) than the opening 104 itself. This pinching of the ion stream can be exploited to increase the resolution of an electrostatic latent image on receptor 27, as will be described in detail below.

While the pinch electrode 106 is used to control the width of the ion stream, displacement electrodes 108 and 110 are used to displace the position of the ion stream within the opening 104, and therefore to essentially "aim" the pinched ion stream to a specific desired area on the receptor 27. Because, by virtue of the pinch electrode 106, the width of the ion stream can be made small relative to the width of the opening 104, the ion stream may be placed on the receptor 27 in an area within the area of the corresponding opening, and with a resolution which is much smaller than the size of the opening 104. Displacement of the ion stream to a precise area on the receptor 27, such as the areas marked A or C on surface 28, is accomplished by adjusting the relative biases of first displacing electrode 108 and second displacing electrode 110.

It is important to note that, in the apparatus of the present invention, displacing electrodes 108 and 110 have the effect of displacing, as opposed to deflecting, the ion stream passing through the opening 104. The ion stream passing from opening 104 to receptor 27 is substantially not angularly deflected relative to the path of ions from source 53 to opening 104, and the stream of ions emerges from opening 104 perpendicularly to the surface of substrate 102, and thus perpendicularly to the surface of receptor 27. Also, the potential difference between either of the displacing electrodes and the receptor creates a "projection field" causing the ion stream to extend perpendicular to the surface of substrate 102 as well. Because, in the basic case described hereinabove, the displacing electrodes 108 and 110 cause displacement of the ion stream and not deflection, ions emerging from a plurality of openings 104 are moved to the receptor 27 in a coherent fashion and the spacing of the receptor 27 from control device 100 is therefore generally not a crucial concern from a "focusing" or displacement standpoint, if a constant projection field is maintained.

In general, the displacement of an ion stream through opening 104 appears to be the result of smaller displacements of the ion stream at various locations: near the surface plane of pinch electrodes 106, within opening 104, at the exit of opening 104, and at a small region beyond the electrodes facing the receptor 27. However, the perpendicularity of the ion stream is maintained when the stream comes under the effect of the projection field between the displacing electrodes and the receptor 27.

Figure 2A:
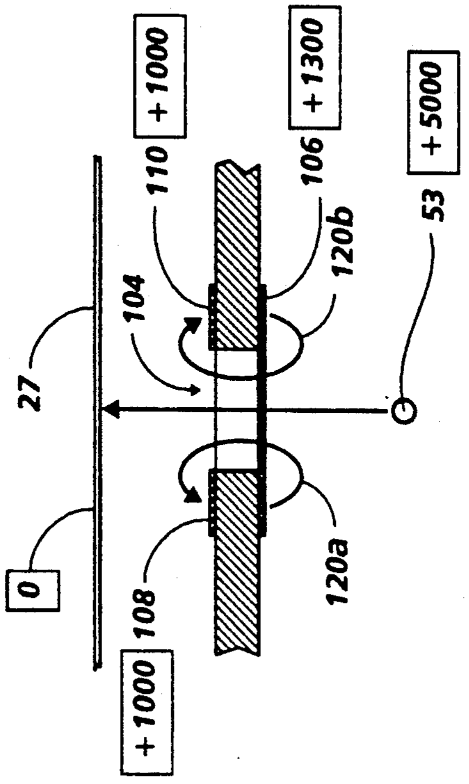
FIGS. 2A-2D is a series of sectional elevational views of one opening for an ion stream in the control device according to the present invention.

FIGS. 2A–2D are a series of comparative views showing how relative biasing of the displacing electrodes 108 and 100 cause a displacement of an ion stream passing through opening 104. In FIG. 2A, the electric fields shown as 120 in FIG. 1 are distinguished as two separate and unequal fields, field 120*a* going from pinch electrode 106 to displacing electrode 108, and field 120*b* going from pinch electrode 106 to displacing electrode 110. When displacing electrodes 108 and 110 are biased equally, no displacement of the ion stream will result and the ion stream will generally pass through the center of opening 104. However, if the relative bias of displacing electrodes 108 and 110 is changed, the ion stream will be displaced away from the more positive displacing electrode, as the ions themselves are positively charged and like charges repel.

In FIGS. 2A–2D, the relative potential biases of the various electrodes are given for a series of cases to show both the displacing and gating (modulation of the ion stream, as in response to digital image data) properties of the control device 100 for various situations. In the FIGS. 2A–2D, the number in the box adjacent the reference number pointing to an electrode is representative of a typical voltage bias on the electrode for a given situation. In FIG. 2A, there is shown the basic case of the control device of the present invention, in which an ion stream emanating from source 53 is caused to pass through opening 104 to receptor 27. In this basic, non-displacing case, the necessary potential well is created with the source 53 biased to +5,000 volts, the pinch electrode 106 biased to +1,300 volts, displacing electrodes 108 and 110 equally biased at +1,000 volts, and receptor 27 biased at 0 volts. Note the descending order of biases as the ion stream moves away from source 53. Looking specifically at pinch electrode 106 and displacing electrodes 108 and 110, the relative biases on these electrodes cause fields, running in the same direction as the ion stream, through opening 104; these fields are known as "pumping" fields for the ion stream.

Figure 2B:
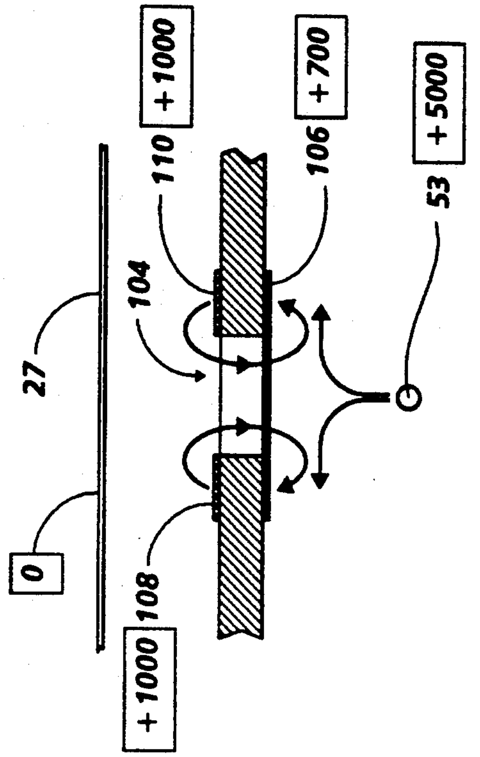

If, at one point in the creation of a latent image on receptor 27, it is desired not to charge a particular area on the receptor 27, the various electrodes may be biased to prevent the passage of the ion stream through opening 104. One such case is illustrated in FIG. 2B. In this case, the biases of source 53 and receptor 27 are the same as in the "pumping" case of FIG. 2A, but the biases of displacing electrodes 108 and 110 have been switched with that of pinch electrode 106. Thus, the ion stream passes from source 53, biased to +5,000 volts, but is interrupted because the descending order of the potential well has been disrupted; the pinch electrode 106 has been biased to a lower potential than the displacing electrodes 108 and 110. Because of this reversal, the fields within opening 104 are not "pumping" fields as in the case of FIG. 2A, but rather "bucking" fields, wherein the field lines within opening 104 are pointed against the ion stream from source 53, with the result that the ion stream from source 53 is pushed aside, away from opening 104, and does not reach receptor 27. Eventually, this displaced ion stream 53 finds a sink somewhere along the conductor 106.

Figure 2C:
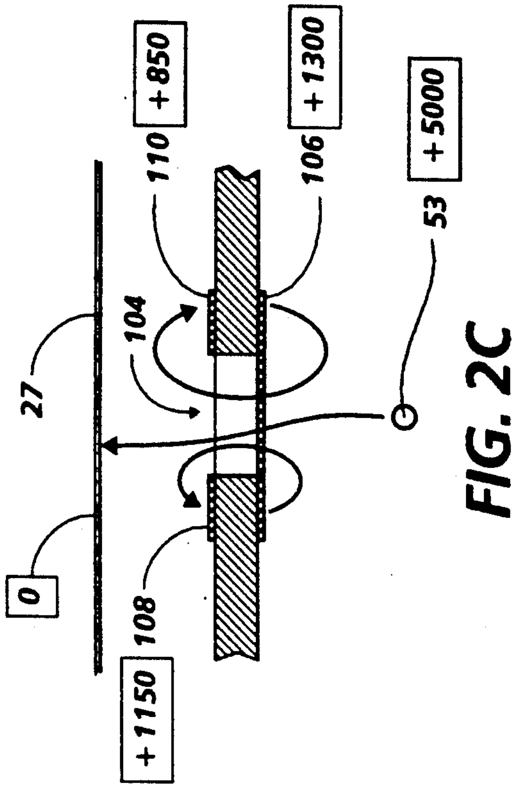

FIG. 2C shows the relative biases of the various electrodes in the case where an ion stream from source 53 is allowed through opening 104, but which is displaced to some extent by a relative bias between displacing electrodes 108 and 110. The biases of source 53, pinch electrode 106, and receptor 27 are identical to that of the basic "pumping" case of FIG. 2A, but the bias on displacing electrode 110 has been decreased to +850 volts, while that on displacing electrode 108 has been increased to +1150 volts, creating a relative bias of 300 volts between the displacing electrodes. This relative bias causes the ion stream from source 53 to be repelled from the displacing electrode 110, because of the greater potential difference relative to pinch electrode 106 on that side of opening 104. Indeed, the amount of displacement of ion stream 53 will depend on, among other values, the amount of relative bias between the displacing electrodes. However, even with the relative bias between displacing electrodes 108 and 110, the descending order of biases from source 53 to receptor 27 is still preserved, as even the lower bias of displacing electrode 110, +850 volts, is significantly higher than the 0 volt bias of receptor 27.

Figure 2D:
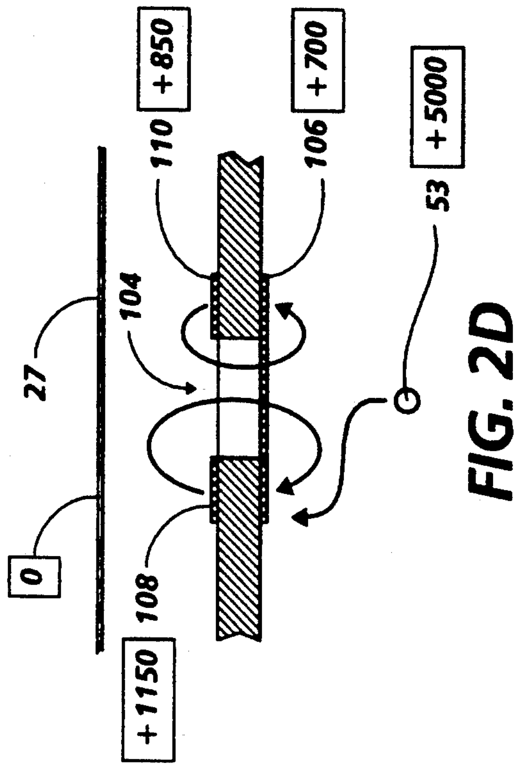

FIG. 2D shows a case similar to that of FIG. 2C, but at an instant in a process of scanning a latent image onto receptor 27, in which it is desired not to place a charge in a certain displaced area. Although the biasing electrodes 108 and 110 are at this point biased for displacement of an ion stream passing through opening 104, at this particular instant, the pinch electrode 106 is biased to a lower potential then the lower of the displacing electrodes, here +700 volts. Once again, this causes a disruption of the potential well, creating "bucking" fields against the ion stream from source 53. The ion stream, being repelled by the counteracting bucking fields, is pushed aside and does not enter opening 104 nor reach receptor 27.

In all of the above cases, the biasing of the various electrodes is accomplished by direct current.

Figure 3:
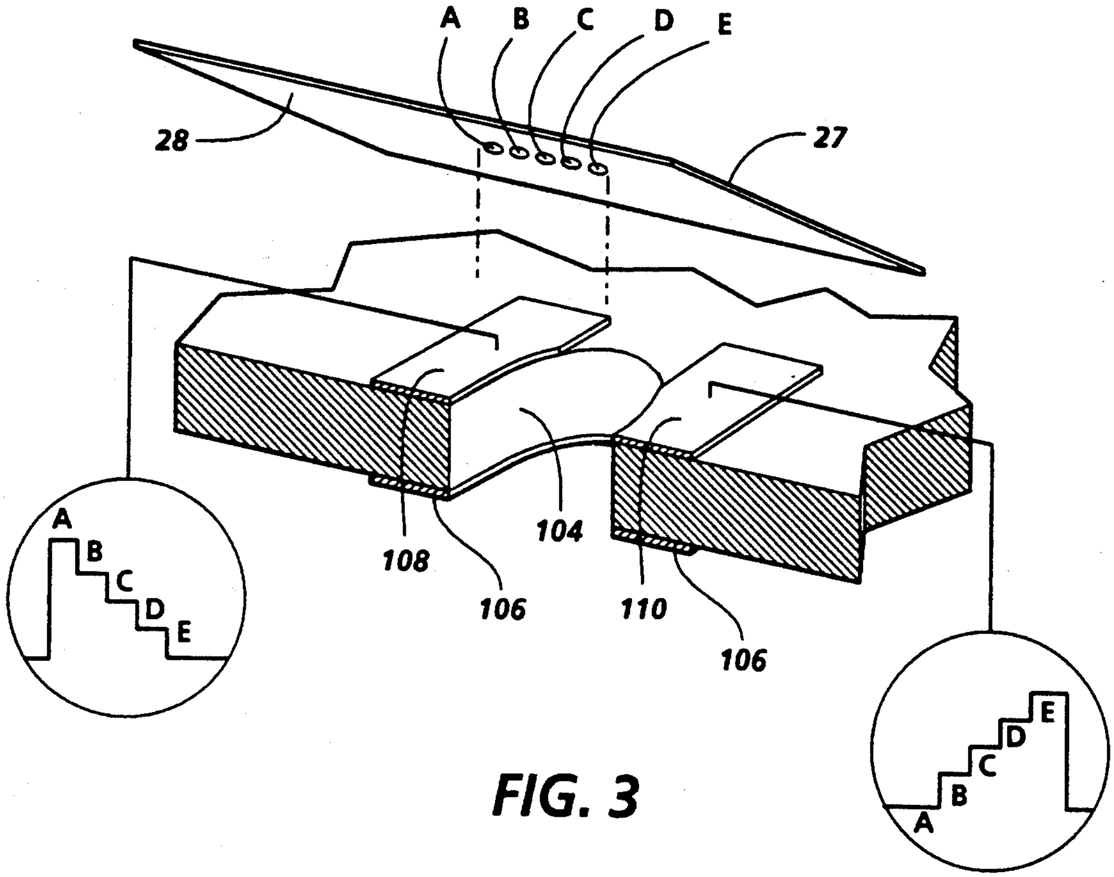
FIG. 3 is a sectional elevational view of one opening for an ion stream in the control device of the present invention, illustrating the placement of charged areas on a receptor.

FIG. 3 illustrates how the relative biasing of displacing electrodes 108 and 110 can be employed to create high-resolution electrostatic images on surface 28 of receptor 27. The individual spots indicated as A, B, C, D, and E on surface 28 represent areas on surface 28 which are charged by the impingement of ions from ion source 53 through one opening 104 in control device 100. Various charged areas such as spots A, B, C, D, and E can subsequently be developed with toner to form desired images. Each spot A, B, C, D, and E represents the end of one pinched ion stream which has been displaced to one of five positions as it passes through opening 104 to "land" in the desired area on surface 28, generally scanning the diameter of opening 104 or slightly greater than the diameter of opening 104. Indicated next to displacing electrodes 108 and 110, respectively, in FIG. 3 are simplified voltage diagrams showing the relative values of voltage biases for the displacing electrodes to cause the ion stream to be placed on the surface 28 in the desired area with the corresponding letter. The voltage levels indicated in the graphs are given for relative values only, and the absolute numerical values of these voltages can be determined when an actual apparatus is designed. Taking the spot marked A as an example, it can be seen that, for placement of such a spot in the desired area, the bias of displacing electrode 108 is low relative to the bias on displacing electrode 110, as can be seen in the graphs. To place the desired spot further to the right in FIG. 3, the bias on displacing electrode 108 is increased while that on displacing electrode 110 is correspondingly decreased, as shown by the relative values of the voltages on either displacing electrode for spots B, C, D, and E. The adjustment of the relative biases of displacing electrodes 108 and 110 can thus be used to create a scanning of the ion stream across the receptor 27, and preferably (from an image creation standpoint) through a direction orthogonal to the direction of motion of receptor 27.

The advantage of these displacing electrodes 108 and 110 is that spots of charged area, which can be accumulated on the surface 28 to form a desired electrostatic latent image, can be made much smaller than the diameter of an opening such as 104, and can be placed with great precision anywhere within the area corresponding to the opening 104. Thus, in the example shown in FIG. 3 in which there are five possible image spots relative to the diameter of opening 104, the possible resolution of an image created is increased fivefold. This increase in resolution can be translated into greater image quality, or can be exploited to create a less expensive control device, with larger and fewer openings 104. Of course, the existence of five sub-spots within the opening 104 is arbitrary; it is conceivable that the resolution within each opening 104 could be increased to, for example, ten spots or higher, through more precise control of the relative bias of the displacing electrodes.

Figure 4:
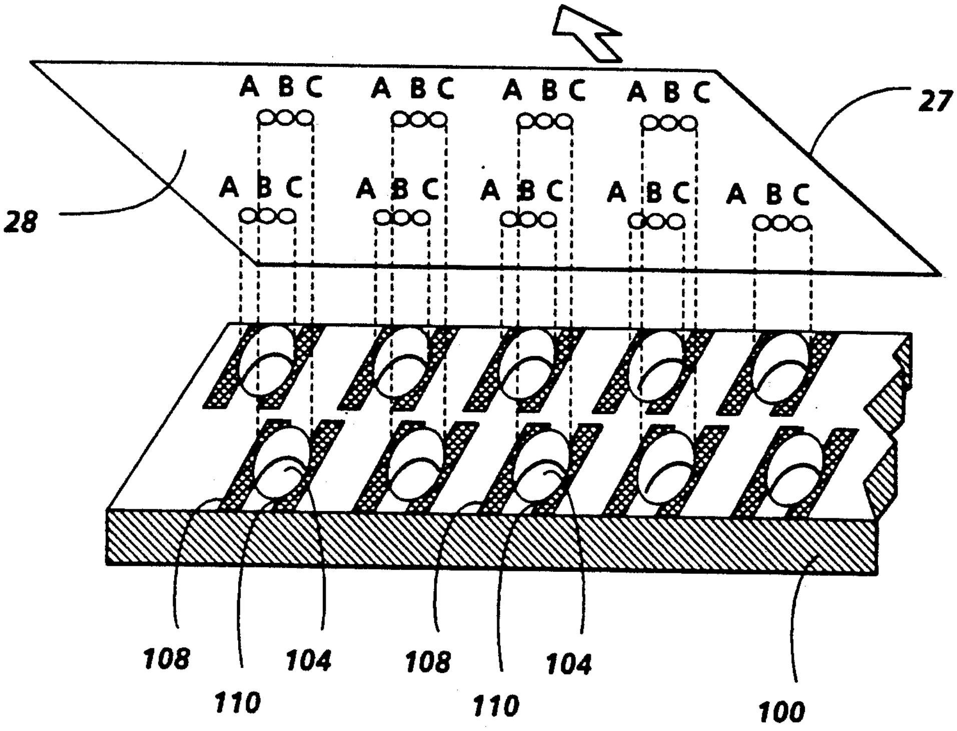
FIG. 4 is an elevational view of a portion of a control device for an ion stream having a staggered linear array of openings therein.

FIG. 4 shows a control device 100 having a plurality of openings 104 in a substantially linear (specifically a staggered linear) array. The openings 104 are arranged perpendicular to the direction of motion of receptor 27, so that lines of areas on surface 28 of receptor 27 to be imagewise charged can be placed on receptor 27 as receptor 27 moves past the staggered linear array. The array of openings 104 is staggered, as shown, to facilitate abutment or slight overlap of areas on the receptor 27 within range of each opening 104.

In the embodiment shown in FIG. 4, each opening 104 in the staggered linear array is suitable for charging three spots (as opposed to five in the embodiment of FIG. 3) within the area "covered" by each opening. Thus, at a given time, by manipulation of pinch electrode 106 and displacing electrodes 108 and 110 for each opening 104, a spot in areas A, B, or C may be placed on the surface 28 as needed to create a particular desired electrostatic latent image. On the opposite side of the control device 100 than is shown in FIG. 4, each opening 104 has associated therewith an independently-controllable pinch electrode 106. As mentioned above, the purpose of pinch electrode 106 is to narrow the ion stream passing through the opening 104 by creating electric fields around the edges of opening 104. Because the pinch electrode 106 on a particular opening 104 can be used to shut off the ion stream completely (as shown in FIGS. 2B and 2D above), the pinch electrode 106 can thus be used for an input of image data to a particular spot being printed at a given moment. For example, if a particular spot in a given image requires the placement of charge in the spot (for subsequent development as a "print-black" area), a pinch electrode 106 can be activated to create the potential well which allows the ion stream to pass to the desired spot. If the desired spot is desired to be a "print-white" area, the pinch electrode 106 can be biased so that no ions reach the spot on surface 28. An array of openings 104, each with an independently controllable pinch electrode 106, then, may be easily adapted to render digital imagewise data on a moving receptor 27, much like any familiar type of dot-matrix printing arrangement. Even though the voltages involved in controlling the pinch electrode 106 can be high, extremely low currents can be employed to avoid expectable problems associated with high power.

In operation, each lettered spot associated with each opening 104 in the staggered linear array may be "printed" (i.e., activated to permit or not permit the passage of ions to the respective spot on the receptor 27 in accordance with imagewise data) at the same time. Thus, by relatively biasing the displacing electrodes 108 and 110 for each individual opening 104 in the same way at the same time, all the spots A in a line may be printed, and then by readjusting the relative bias of every displacing electrode in the linear array, spots B and then C can be printed. Then, as the receptor 27 continues its relative motion, the next line of image data can be printed. The staggering of openings 104 in the array of course creates a staggered printing line, as shown, but this can be compensated for by delaying the loading of data as necessary to every other opening 104, in a manner which would be apparent to one skilled in the art. Similarly, the continuous movement of receptor 27 may require a compensation in the nature of the image data to the spots A, B, C in succession, since a finite amount of time is necessary to allow the creation of the spot with a necessary charge. Again, this compensation in data loading for the time-lag in printing spots A, B, C for each opening 104 can be carried out by means apparent to one skilled in the art.

Figure 5A:
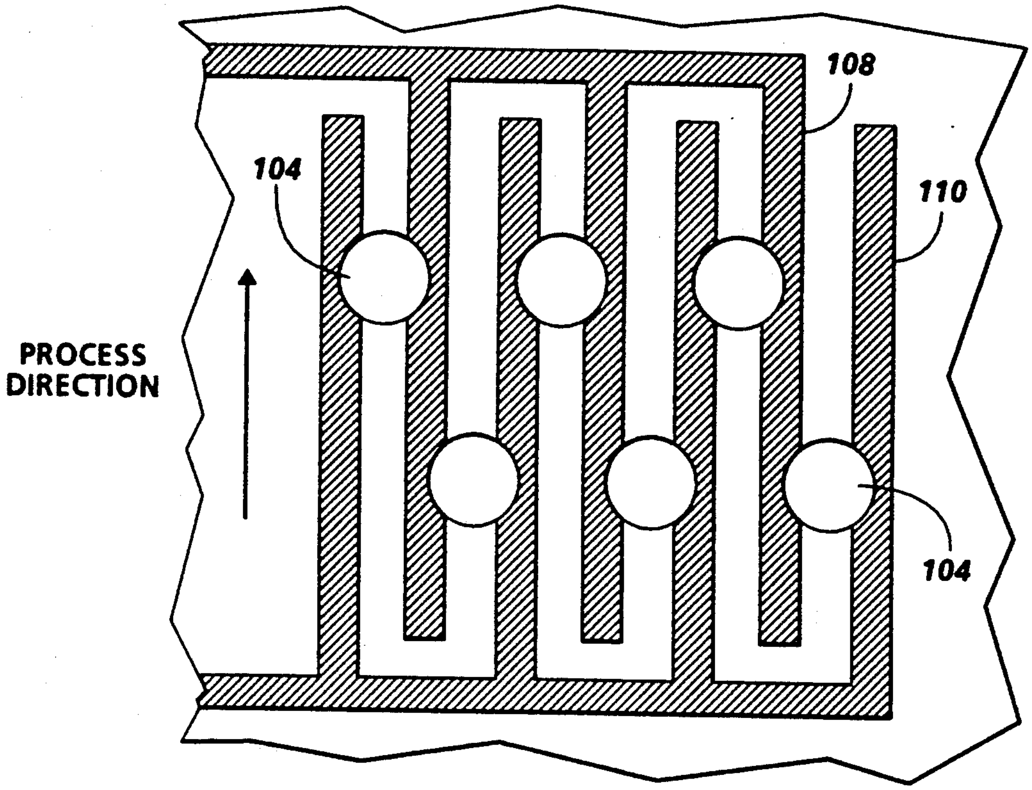
FIGS. 5A-5E are a series of plan views showing typical configurations of displacing electrodes in the control device of the present invention.
Figure 5B:
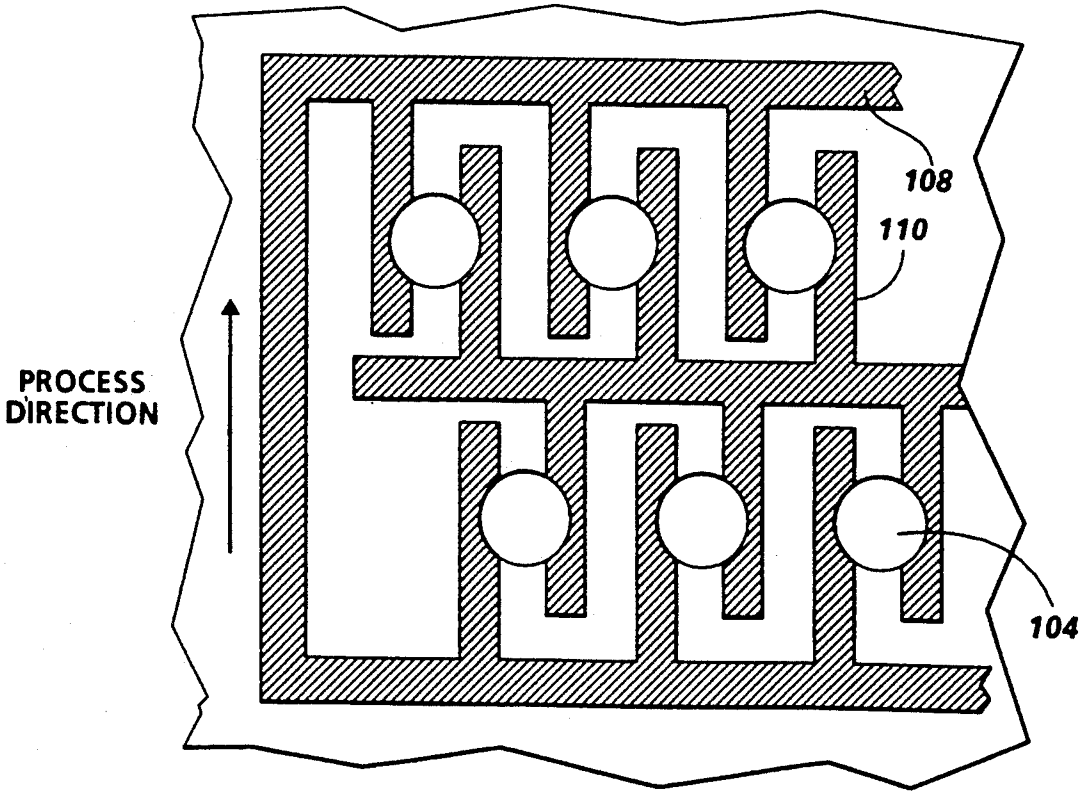
Figure 5C:
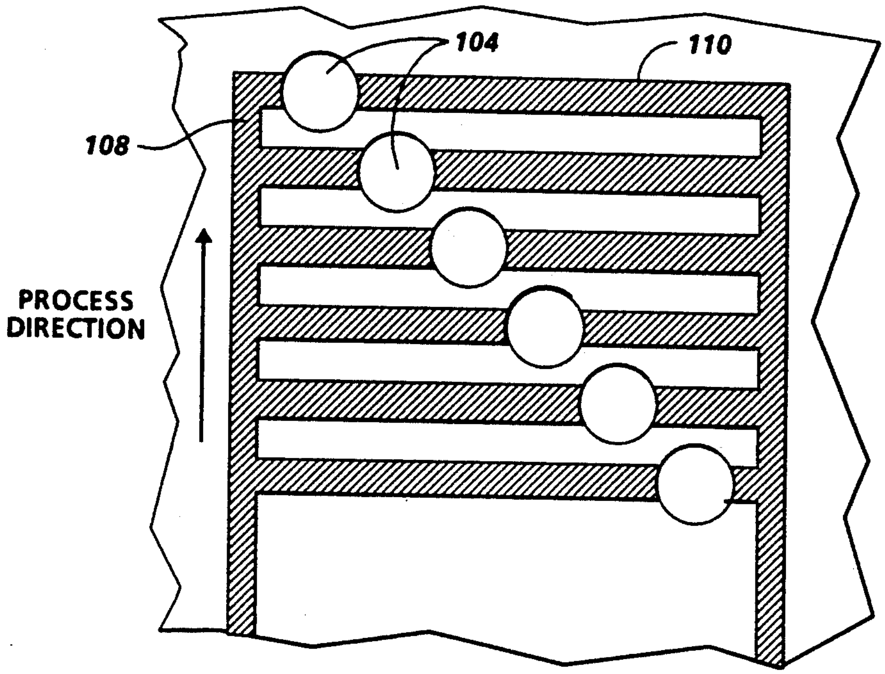
Figure 5D:
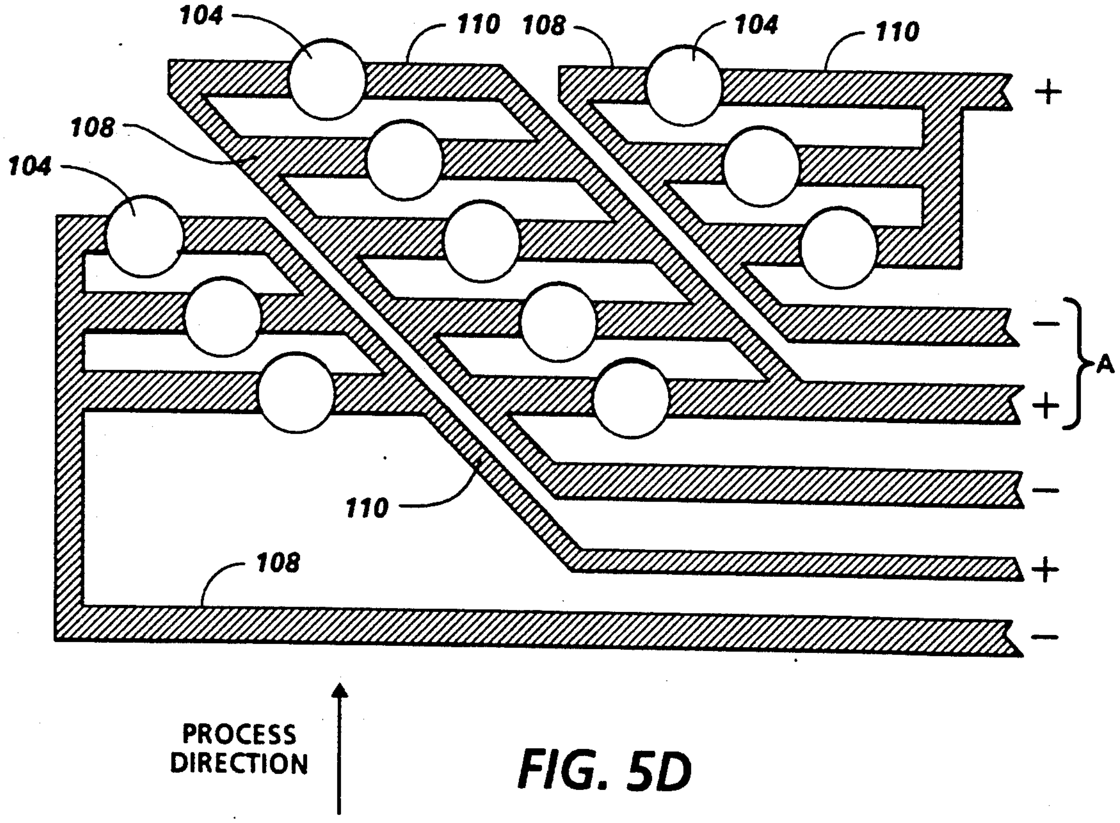
Figure 5E:
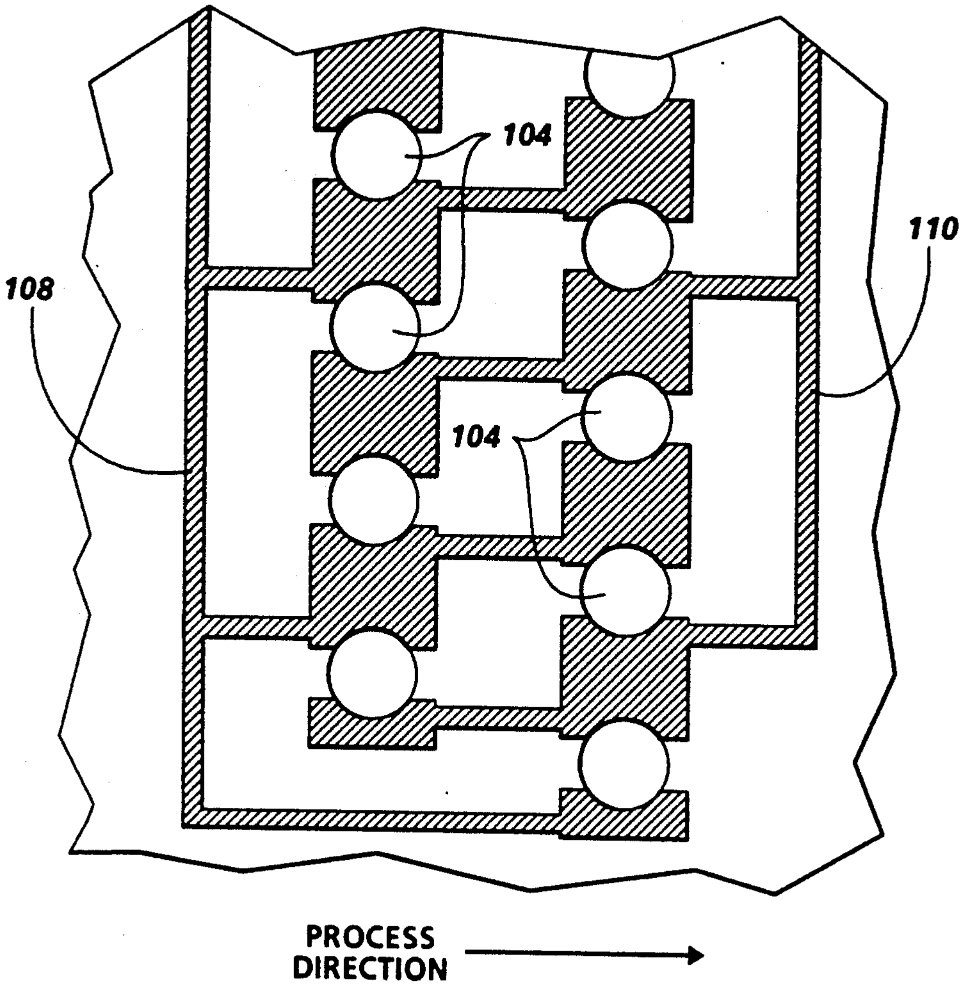

A convenient feature of printing each spot in a given position relative to each opening 104 simultaneously for every opening in the staggered linear array is that the displacing electrodes 108 and 110 for each individual opening 104 can be controlled commonly. If all of the A spots, for example, are printed simultaneously, the relative bias of the displacing electrodes 108 and 110 is equal for each opening 104. This uniform control of each pair of displacing electrodes facilitates numerous design simplications. FIGS. 5A–5E show a series of possible configurations of displacing electrodes 108 and 110 as they may be associated with a series of openings 104. Of these, the configuration of FIG. 5E is most preferred. Such arrangements may be easily carried out by well-known circuit-printing techniques to place the electrodes 108 and 110 on the substrate 102, such as etching, sputtering, or vacuum deposition.

Figure 6A:
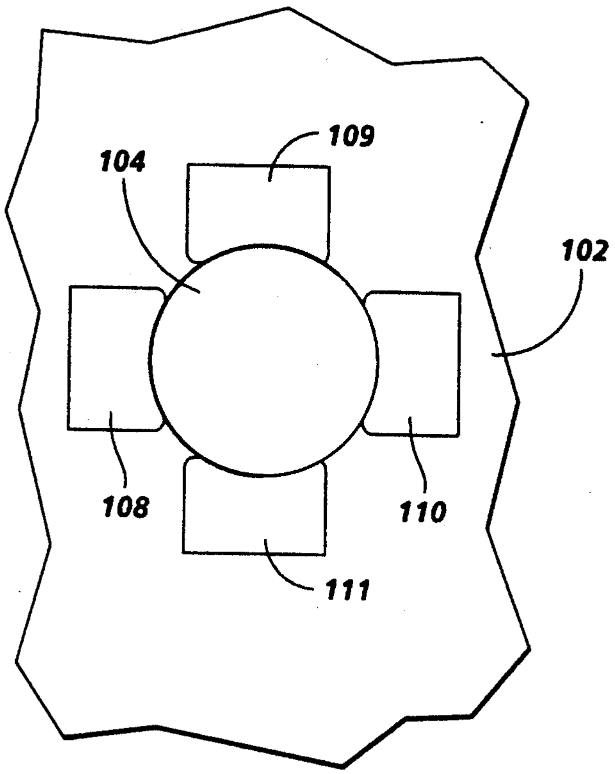
FIGS. 6A and 6B are plan views showing configurations of displacing electrodes in an alternate embodiment of the present invention.
Figure 6B:
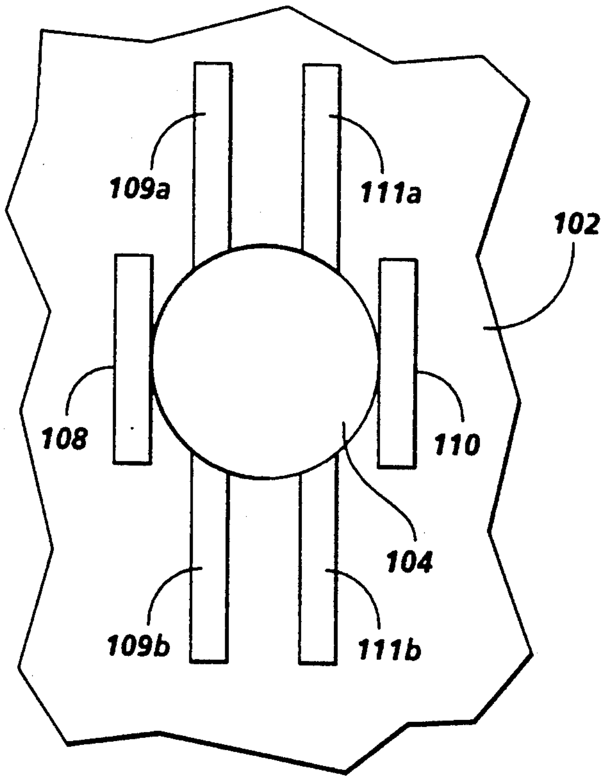

Although the embodiment of FIG. 4 shows how digital image data can be placed with high resolution on receptor 27 by causing displacement of individual ion streams within each opening 104 in a direction perpendicular to the process direction of receptor 27, it is possible to modify the present invention to permit displacement of the ion stream in two dimensions within each opening 104. FIGS. 6A and 6B show arrangements of multiple electrodes around the opening 104 so that a pinched stream of ions coming through opening 104 can be displaced not only in the dimension between displacing electrodes 108 and 110, but in the dimension between, for example, additional displacing electrodes 109 and 111 in FIG. 6A. Thus, with this embodiment, it is possible to displace the ion stream not only in a direction perpendicular to the motion of receptor 27, but also in an upstream and downstream sense as well. The embodiment of FIG. 6B shows six displacing electrodes 108, **109*a*, 109*b*, 110, 111*a*, and 111*b* around opening 104**, for precise displacement of the ion stream to various possible locations.

Although the embodiment of FIG. 4 shows the apparatus of the present invention used to print out digitized image data on a moving receptor, the displacing electrodes 108 and 110 need not be confined to digitized operations, particularly if large openings 104 with precise placement of an ion stream within the large openings 104 is possible. Conceivably, displacing electrodes 108 and 110 could be connected to a source of analog data, whereby manipulation of the relative voltage biases to the displacing electrodes 108 and 110 while the receptor 27 is moving relative thereto, so that an apparatus according to the present invention could be used as an analog plotter.

Figure 7:
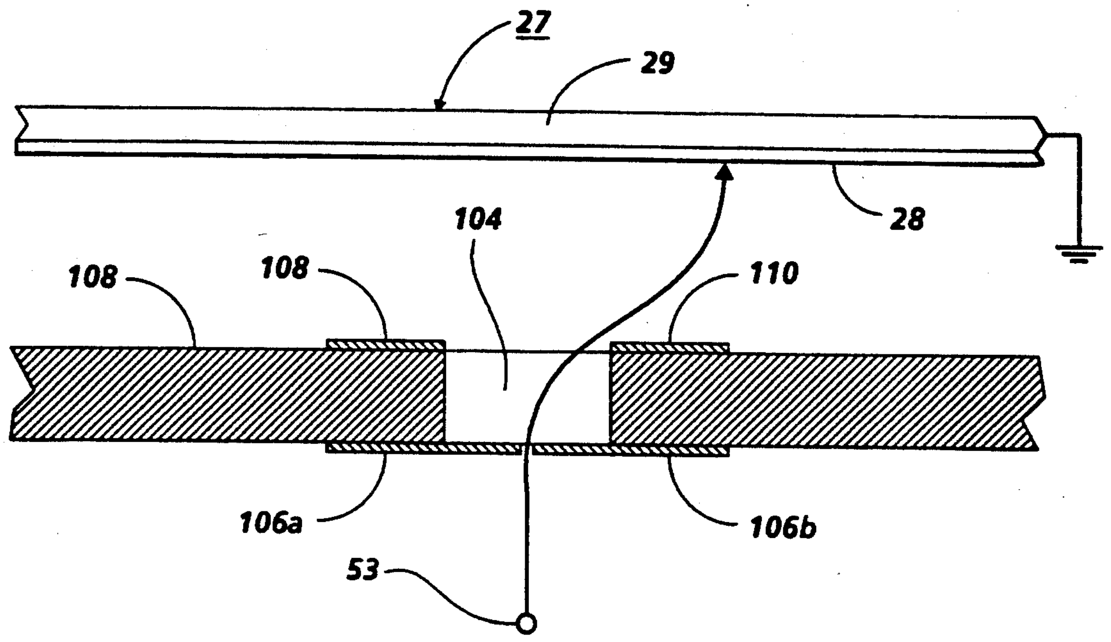
FIG. 7 is a sectional elevational view of one opening for an ion stream according to another alternate embodiment of the present invention.

Although, as mentioned above, the primary function of displacing electrodes 108 and 110 is to displace, rather than deflect, the stream of ions passing through opening 104, it is possible to adapt the present invention to cause both the displacement and deflection of ion streams within opening 104. An example of this variation to the present invention is shown in FIG. 7. The embodiment of FIG. 7 is similar to that of above embodiments, with the exception that the pinch electrode 106 is itself divided into sub-electrodes 106*a* and 106*b*Sub-electrodes 106*a* and 106*b* surround the edge of opening 104 on the side facing source 53, in a substantially complementary way so that substantially all of the edge of opening 104 on that side is "covered" by a sub-electrode. In general, sub-electrodes 106*a* and 106*b* can share a common bias to narrow the ion stream, as in the general case, but in this variation, the two sub-electrodes 106*a* and 106*b* can also be biased relative to each other, in addition to the relative biases of displacing electrodes 108 and 110. Thus, in this arrangement, an ion stream passing through 104 can, in effect, be deflected twice: once at the edge of opening 104 having sub-electrodes 106*a* and 106*b*, and again at the other edge of opening 104. However, it has been discovered that this additional deflection can be useful, because, as shown in FIG. 7, a deflection of an ion stream can cause a spot to be charged on surface 28 of receptor 27 even if the desired location of the spot is not directly adjacent opening 104. Conceivably, this ability means that even fewer openings 104 may be necessary in a linear array to "cover" a line of digital data on the receptor 27. A preferred technique for accessing these additional areas on receptor 27 with a deflected ion stream is by manipulating the relative biases of the sub-electrodes 106*a* and 106*b* and displacing electrodes 108 and 110 in such a way that the bias of the sub-electrode is equal to that of the neighboring displacing electrode, i.e., in FIG. 7, sub-electrode 106*a* should have the same bias as displacing electrode 108, and sub-electrode 106*b* should have the same bias as displacing electrode 110.

Figure 8:
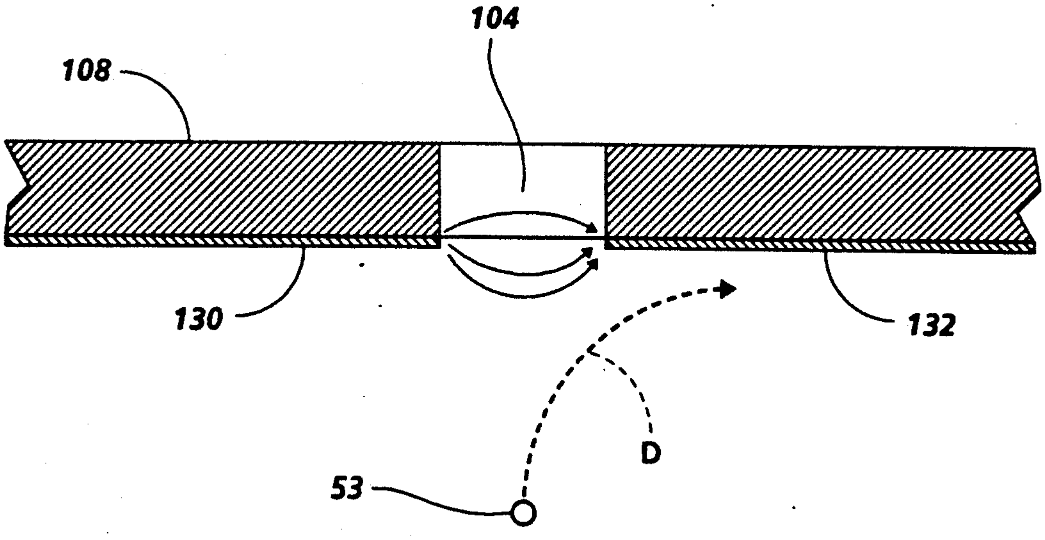
FIG. 8 is a sectional elevational view of an opening for an ion stream in a control device according to another alternate embodiment of the present invention.

FIG. 8 shows an alternate embodiment of the present invention, in which the functions of the pinch electrode and the displacing electrodes are combined in a single pair of electrodes around the opening 104 only on one side of the substrate 102. Here, gating electrodes 130 and 132 operate both for displacement and for receiving image data to electrically "open" or "close" the opening 104 to the ion stream. Instead of creating pumping fields through the opening 104 as in the above embodiments, but instead is such a strength between gating electrodes 130 and 132 on opposite sides of the opening 104, that both functions may be accomplished with a single electric field going across opening 104. While electrodes 130 and 132 operate much like displacing electrodes 108 and 110 in the above-described embodiment to displace the ion stream, gating is accomplished by, in effect, displacing the ion stream, with a sufficient relative bias between electrodes 130 and 132 to such an extent that the ion stream can be displaced away from the opening 104 completely, as shown by the stream indicated by the dotted line in FIG. 8. The creation of large electric fields within openings 104 has been found not to create significant problems of cross talk among a plurality of openings 104, because the openings 104 can be spaced relatively far apart in the control device 100.

In creating a practical version of an ionographic printer according to the present invention, certain subtle considerations are preferably taken into account in order to obtain satisfactory results. A first practical consideration is ensuring the uniformity of spot size, depending on the extent of displacement of the ion stream through the control device 100. It has been found that, in an uncontrolled situation, an increase in displacement through opening 104 causes the ion stream to spread and create a larger than desired charged area on surface 28 of receptor 27. In order to solve this problem, a number of approaches are possible. Assuming that the ion source 53 is in the form of a corona wire, one simple method of compensating for variations in stream width is to control the current to the corona wire so that the corona wire provides the appropriate amount of charge at each displacement location relative to the opening 104. This compensation may be carried out using, for example, a feedback control loop responding either to the displacing electrodes themselves, or to a clock by which the relative biases of the displacing electrodes are varied according to a scanning process.

Another design parameter which has been seen to have an effect on quality of the latent image created on receptor 27 is the relative thickness of pinch electrode 106 or displacing electrodes 108 and 110. In general, increasing the thickness of the electrodes on one side of the substrate 102, either pinch electrode 106 or displacing electrodes 108 or 110 in the basic case, increases either the sharpness of the edges of the spot created on the receptor, or increases the efficiency of depositing charge on the receptor 27. However, it has also been discovered that the quality improvements occur only if the thickness is increased on one side of the substrate; increasing the thickness of electrodes on both sides tends not to yield this improvement.

Another design parameter which is of interest is the relationship of the current in source 53 to the resulting size of a spot created on the receptor 27. In general, the relationship is that an increase in the current to the source 53 results in a larger charged area on the receptor 27.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An ionographic image printing apparatus, comprising:

an ion source;

a charge receptor; and an ion deposition control device operatively interposed between the ion source and the charge receptor, the control device being adapted to narrow ions emitted from the ion source into an ion stream of a predetermined cross-sectional area, and to displace the ion stream to a predetermined position on the charge receptor, the ion deposition control device including a substrate defining an aperture therethrough for the passage of ions from the ion source to the charge receptor, and a field generator for creating an electric field passing from a surface of the substrate adjacent the ion source through the aperture in the substrate.

2. An apparatus as in claim 1, wherein the ion deposition control device includes means for narrowing ions emitted from the ion source into an ion stream of a predetermined cross-sectional area, and means for displacing the ion stream to a predetermined position on the charge receptor.

3. An ionographic image printing apparatus, comprising:

an ion source;

a charge receptor; and an ion deposition control device operatively interposed between the ion source and the charge receptor, including an insulative substrate, defining an aperture therethrough for the passage of ions from the ion source to the charge receptor, a pinch electrode operatively disposed at an edge of the aperture on the surface of the substrate facing the ion source, for controlling the cross-sectional area of an ion stream passing through the aperture, and a pair of electrodes, each of the electrodes being disposed at different respective portions of an edge of the aperture on the surface of the substrate facing the charge receptor, for controlling the position of an ion stream within the aperture, the pinch electrode and the pair of electrodes being adapted to create an electric field passing through the aperture.

4. An apparatus as in claim 3, wherein the pinch electrode and at least one of the electrodes of the pair are adapted to be electrically biased relative to one another to form a potential well.

5. An apparatus as in claim 3, wherein each of the electrodes of the pair are adapted to be electrically biased relative to one another.

6. An apparatus as in claim 3, wherein the charge receptor is adapted to be biased relative to one of the electrodes of the pair.

7. An apparatus as in claim 3, further including means for varying the relative biases of the electrodes of the pair, thereby causing an ion stream passing through the opening to be scanned through a direction orthogonal to the direction of motion of the receptor.

8. An apparatus as in claim 3, wherein the ion source includes a DC-biased electrode.

9. An apparatus as in claim 3, further including means for DC biasing of the pinch electrode and the electrodes of the pair.

10. An apparatus as in claim 3, wherein the ion deposition control device further includes positioning means for controlling the electrical bias of each of the electrodes of the pair relative to one another in accordance with a desired position of the ion stream within the aperture.

11. An apparatus as in claim 10, wherein the positioning means controls the electrical bias of the electrodes of the pair relative to one another in accordance with a plurality of fixed predetermined relationships, each relationship being associated with one position of the ion stream within the aperture.

12. An apparatus as in claim 10, further comprising image-processing means, including means for controlling the positioning means for directing an ion stream through the aperture to a preselected area on the charge receptor, and means for controlling the pinch electrode to gate the passage of an ion stream through the aperture, in accordance with imagewise data associated with the preselected area on the charge receptor.

13. An apparatus as in claim 3, comprising a plurality of apertures defined in the ion deposition control device, each aperture having image-processing means associated therewith, and adapted for simultaneous operation for imagewise ion deposition in a plurality of preselected areas on the charge receptor.

14. An apparatus as in claim 13, wherein a pair of electrodes is associated with each of the plurality of apertures with each of the pair of electrodes being commonly controlled.

15. An apparatus as in claim 3, wherein the pinch electrode comprises a pair of sub-electrodes, each sub-electrode of the pair being disposed along substantially complementary portions of the edge of the aperture facing the ion source, and operable together for controlling the cross-sectional area of an ion stream passing through the aperture, and also adapted to be biased relative to each other and relative to the pair of electrodes for deflection of the ion stream within the aperture.

16. An apparatus as in claim 3, wherein the aperture is of a diameter between 0.005 inches and 0.2 inches.

17. An apparatus as in claim 2, the ion deposition control device including an insulative substrate, defining an aperture therethrough for the passage of ions from the ion source to the charge receptor, and a pair of electrodes, disposed at different respective portions of an edge of the aperture on the surface of the substrate facing the ion source, for controlling the position of an ion stream within the aperture, the pair of electrodes being adapted to be selectably electrically biased relative to one another to control the position of the ion stream through the aperture, and adapted to be selectably electrically biased relative to one another to divert the ion stream from the aperture.

* * * * *